US006304636B1

(12) United States Patent
Goldberg et al.

(10) Patent No.: US 6,304,636 B1
(45) Date of Patent: Oct. 16, 2001

(54) FORWARDING VOICE MESSAGES TO A CALLED PARTY USING ELECTRONIC MAIL

(75) Inventors: Randy G. Goldberg, Princeton; Robert Edward Markowitz, Glen Rock; Kenneth H. Rosen, Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/996,872

(22) Filed: Dec. 23, 1997

(51) Int. Cl.[7] ........................... H04M 1/64; H04M 11/00; H04M 3/42
(52) U.S. Cl. ................... 379/88.14; 379/215; 379/88.13; 379/88.12; 379/93.24
(58) Field of Search .................................. 379/69, 88.13, 379/88.14, 142, 215, 88.04, 88.07, 88.1, 88.11, 88.12, 93.24, 93.35, 100.08, 93.25, 100.13, 100.16, 100.15; 370/352

(56) References Cited

U.S. PATENT DOCUMENTS

| | | |
|---|---|---|
| 4,995,074 | 2/1991 | Goldman et al. . |
| 5,007,076 * | 4/1991 | Blakely .................................. 379/67 |
| 5,274,700 | 12/1993 | Gechter et al. . |
| 5,363,431 | 11/1994 | Schull et al. . |
| 5,428,608 | 6/1995 | Freeman et al. . |
| 5,436,963 | 7/1995 | Fitzpatrick et al. .................. 379/212 |
| 5,461,665 * | 10/1995 | Shur et al. ........................... 379/67.1 |
| 5,465,295 | 11/1995 | Furman ................................ 379/211 |
| 5,475,738 * | 12/1995 | Penzias .............................. 379/88.13 |
| 5,530,740 * | 6/1996 | Irribarren et al. .................... 379/212 |
| 5,533,110 | 7/1996 | Pinard et al. . |
| 5,557,659 * | 9/1996 | Hyde-Thomson ................. 379/88.13 |
| 5,604,788 | 2/1997 | Tett ........................................ 379/58 |
| 5,608,786 * | 3/1997 | Gordon ................................ 379/100 |
| 5,712,901 * | 1/1998 | Meermans ............................ 379/229 |
| 5,712,907 | 1/1998 | Wegner et al. . |
| 5,724,412 | 3/1998 | Srinivasan . |
| 5,742,596 | 4/1998 | Baratz et al. . |
| 5,751,706 | 5/1998 | Land et al. . |

(List continued on next page.)

FOREIGN PATENT DOCUMENTS

| | | |
|---|---|---|
| 758175A1 | 2/1997 | (EP) . |
| WO 97/14238 | 4/1997 | (WO) . |
| WO 97/16007 | 5/1997 | (WO) . |
| WO 97/37483 | 10/1997 | (WO) . |
| WO 97/47118 | 12/1997 | (WO) . |

OTHER PUBLICATIONS

COLIN LOW, The Internet Telephony Red Herring, HP Laboratories Bristol, HPL 96–98, Jun. 1996.

R. BABBAGE, I. MOFFAT, A. O'NEILL, S. SIVARAJ, Internet Phone–Changing the Telephony Paradigm?, BT Technol J., vol. 15, No. 2, Apr. 1997.

INTERNATIONAL SWITCHING SYMPOSIUM, 1992, Diversification and Integration of Networks and Switching Technologies Towards the 21st Century, Yokohama, Japan, Oct. 25–30, 1992, Proceedings, vol. 2.

Primary Examiner—Curtis A. Kuntz
Assistant Examiner—Rexford N. Bernie
(74) Attorney, Agent, or Firm—Kenyon & Kenyon

(57) ABSTRACT

A system and apparatus provides a voice message of a calling party to a called party. The method includes the steps of initiating a telephone call to the called party over a first network and receiving the telephone call at a network node within the first network. The method further includes the steps of determining whether the called party is on-line a second network and receiving the voice message from the calling party. The method further includes the steps of converting the voice message to a digital file and sending an electronic mail message that includes the digital file to the called party.

12 Claims, 2 Drawing Sheets

U.S. PATENT DOCUMENTS

| | | | |
|---|---|---|---|
| 5,751,791 | * | 5/1998 | Chen et al. .................. 379/88.13 |
| 5,768,513 | | 6/1998 | Kuthyaret et al. . |
| 5,805,587 | * | 9/1998 | Norris et al. .................. 370/352 |
| 5,805,857 | | 9/1998 | Norris et al. . |
| 5,809,128 | * | 9/1998 | McMullin ...................... 379/215 |
| 5,870,454 | * | 9/1999 | Dahlen .......................... 379/88.13 |
| 5,870,565 | | 2/1999 | Glitho . |
| 5,894,504 | * | 4/1999 | Alfred et al. .................. 379/215 |
| 5,896,444 | | 4/1999 | Perlman et al. . |
| 5,916,302 | | 6/1999 | Dunn et al. . |
| 5,943,398 | * | 2/1999 | Klein et al. ................... 379/88.13 |
| 5,946,381 | * | 8/1999 | Danne et al. .................. 379/142 |
| 5,982,856 | * | 11/1999 | Cohn et al. .................... 379/88.06 |
| 6,011,909 | | 1/2000 | Newlin et al. . |

* cited by examiner

FORWARDING VOICE MESSAGES TO A CALLED PARTY USING ELECTRONIC MAIL

FIELD OF THE INVENTION

The present invention is directed to a system for forwarding voice messages to a called party. More particularly, the present invention is directed to a system for forwarding voice messages to a called party using electronic mail.

BACKGROUND OF THE INVENTION

With the advent of cellular phones and pagers, an individual person may have multiple telephone numbers associated with them. Telephone routing systems exist to automatically route calls intended for a called party to multiple phone numbers in an attempt to reach the called party. For example, a routing system can automatically route telephone calls for a called party to the called party's business phone, then home phone, then cellular phone, then pager device.

Sometimes a called party cannot respond to a telephone call to any of the phone numbers associated with the called party. In this case, known telephone answering systems can record a voice message from the calling party. This message can be later retrieved by the called party. However, the calling party has no way to determine when or if the called party has retrieved the message. Further, the calling party may desire that the called party be able to immediately retrieve the message.

Based on the foregoing, there is a need for a system and method that allows a calling party to leave a voice message for a called party that can be immediately retrieved by the called party, and that provides an indication to the calling party that the message has been retrieved.

SUMMARY OF THE INVENTION

One embodiment of the present invention is a system and method for providing a voice message of a calling party to a called party. The method includes the steps of initiating a telephone call to the called party over a first network and receiving the telephone call at a network node within the first network. The method further includes the steps of determining whether the called party is on-line on a second network and receiving the voice message from the calling party. The method further includes the steps of converting the voice message to a digital file and sending an electronic mail message that includes the digital file to the called party.

DETAILED DESCRIPTION

One embodiment of the present invention is a telephone network service that transmits a voice message from a calling party to a called party via electronic mail ("e-mail") if the called party is on-line. The present invention can then immediately notify the calling party if the message has been retrieved. The present invention can further allow the calling party to talk live to the called party or receive a voice message from the called party.

Figure 1:
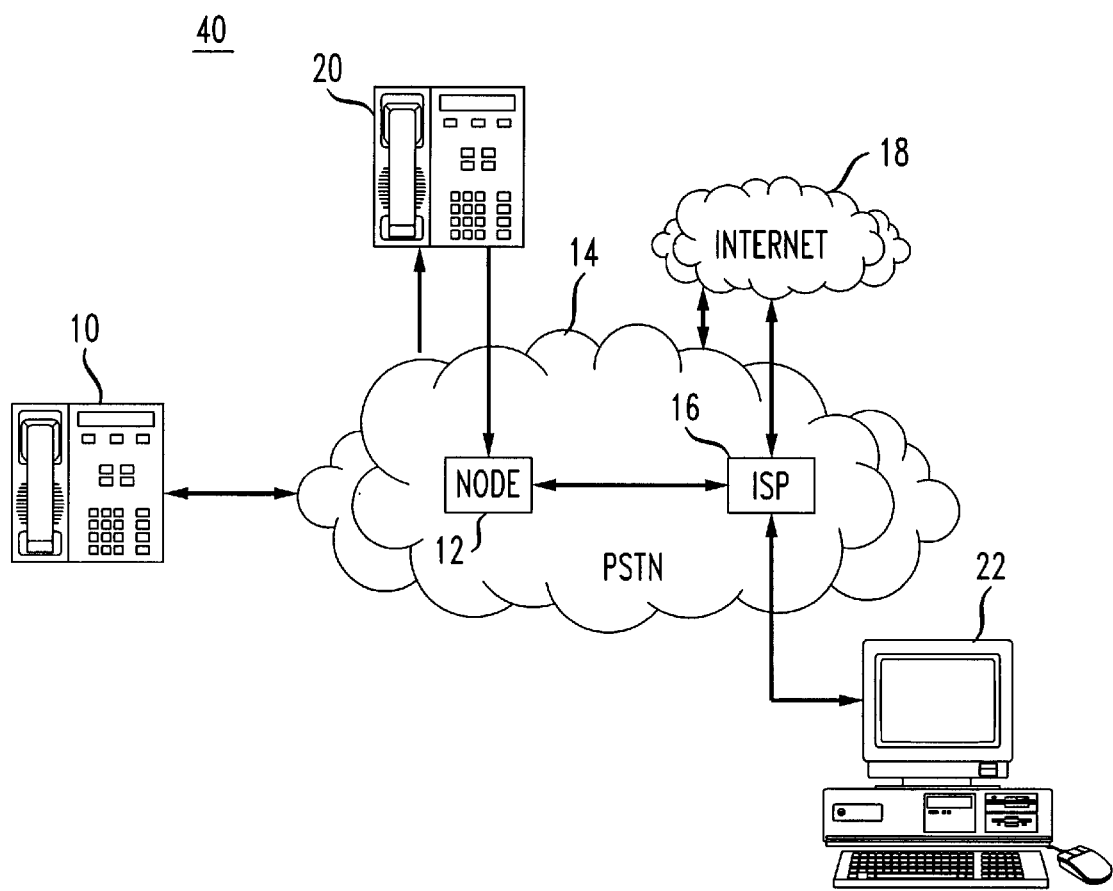
FIG. 1 illustrates a voice message system in accordance with one embodiment of the present invention.

FIG. 1 illustrates a voice message system in accordance with one embodiment of the present invention. The system 40 includes a network 14 coupled to a network 18. In one embodiment, network 14 is the Public Switched Telephone Network ("PSTN") and network 18 is the Internet.

System 40 further includes telephones 10 and 20 coupled to network 14. A calling party initiates a telephone call using telephone 10. A called party receives the telephone call using telephone 20 at a phone number associated with the called party. The telephone call is routed from telephone 10 to telephone 20 through network 14.

A network node 12 is one of the nodes within network 14. In one embodiment, node 12 is a general purpose computer that includes a processor and memory. Node 12 is programmed to perform the steps of the present invention that are described below. Node 12 stores a list of all called parties that subscribe to the voice message system of the present invention and a corresponding e-mail address for each called party.

All telephone calls intended for the called party at telephone 20 are automatically routed to network node 12 if the called party is unavailable at telephone 20 (i.e., the called party does not answer telephone 20 or telephone 20 is busy). A service similar to "Home Voice Mail" available from Bell Atlantic Corp. or other known voice systems that are implemented on a local phone switch can perform the function of automatically routing incoming calls for telephone 20 to node 12 if the calls are not answered.

System 40 further includes a computer 22. Computer 22 is a general purpose computer that allows a user to access network 14 and/or network 18 (i.e., the Internet) and receive and send electronic mail over network 18. In one embodiment, computer 22 is equipped with a sound card that allows a user to listen to audio files, a modem for dialing into a network, and a microphone. Computer 22 accesses network 18 by dialing into an Internet Service Provider ("ISP") 16. ISP 16 is coupled to network 18. ISP 16 is further coupled to node 12 through network 14.

Figure 2:
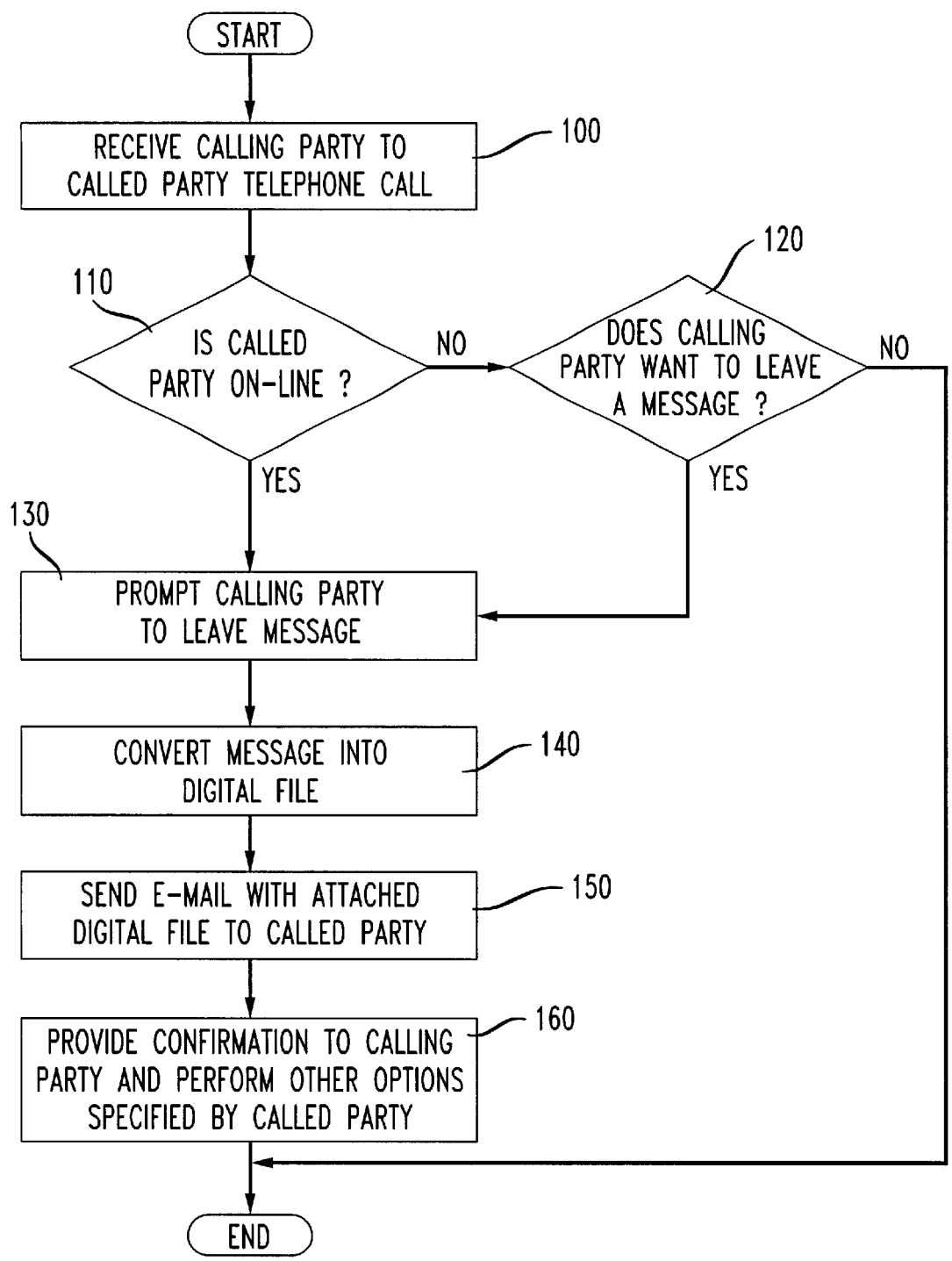
FIG. 2 is a flowchart illustrating the steps performed by a network node accordance with one embodiment of the present invention.

FIG. 2 is a flowchart illustrating the steps performed by network node 12 in accordance with one embodiment of the present invention when a calling party at telephone 10 initiates a telephone call to a called party at telephone 20.

At step 100, node 12 receives the telephone call from the calling party at phone 10 to the called party at phone 20 (i.e., at a phone number associated with the called party) if the called party does not answer the telephone call. As previously discussed, the telephone call is automatically routed to node 12 when the called party does not answer. When the telephone call is routed to node 12, node 12 also receives information that identifies the called party. In another embodiment, the calling party can directly dial a number associated with node 12 in order to leave a voice message for the called party. In such an embodiment, node 12 will prompt the calling party to identify the called party by, for example, entering the telephone number of the called party.

At step 110, node 12 determines whether the called party is on-line with respect to network 18 via computer 22 and therefore can immediately be reached by electronic mail. In one embodiment, computer 22 is a Unix-based computer, and node 12 can issue a Unix "finger" command over network 18. The response to the finger command by computer 22, received by node 12 determines whether the called party is on-line. In another embodiment, computer 22 is programmed to automatically send an e-mail message to node 12 during predetermined times (e.g., every 1 minute) when the called party is on-line. In still another embodiment, computer 22 is programmed to automatically send an e-mail to node 12 when the called party becomes on-line (i.e., when the called party logs on) and when the called party is no longer on-line (i.e., when the called party logs off).

If it is determined that the called party is on-line at step 110, node 12 performs step 130. If it is determined that the called party is not on-line at step 110, at step 120 node 12 determines whether the calling party wants to leave a voice message that will not be immediately available to the called party. If the calling party does not want to leave a message, the telephone call is ended. If the calling party does want to leave a message, node 12 performs step 130.

At step 130, node 12 prompts the calling party to leave a voice message for the called party. The voice message is then received by node 12.

At step 140, the voice message received from the calling party is converted into a digital audio file (e.g., a "WAV" file, an "AU" or Mu-law file, a RealAudio® file, a pulse code modulation file, etc.). Step 140 includes an analog-to-digital conversion in node 12 of the voice message if the voice message is received by node 12 as an analog signal. In another embodiment, node 12 converts the voice message to digitized text using a speech-to-text converter.

At step 150, an e-mail is sent to the called party at computer 22. The digital audio file formed at step 140 is included with the e-mail as an attachment in one embodiment. In another embodiment, if the voice message was converted to text at step 140, the digitized text is included within the body of the e-mail.

After the e-mail is sent, the calling party is given the option of remaining on hold by node 12 if the called party was determined to be on-line at step 110. When the called party retrieves or opens the e-mail, the voice message in the form of the audio file can be listened to by the called party, or the text message can be read by the called party. Opening the e-mail automatically generates an indication that the e-mail was opened. The indication is sent to node 12. In one embodiment, the indication is a confirmation e-mail that is automatically generated and sent to node 12 when the received e-mail is open by the called party. At step 160, node 12 provides the calling party with a confirmation that the e-mail has been opened when the indication is received. If the calling party remains on hold, the confirmation that the called party has opened the e-mail is immediately received by the calling party. If the calling party does not wish to remain on hold, the calling party can request a call back from node 12 when the called party opens the e-mail. Therefore, this step provides the calling party with the option of immediate feedback when the called party retrieves the voice message.

Other options are performed by node 12 if the calling party remains on hold at step 160. These options can be specified by the called party when the called party sets up the service described by the present invention. One option allows the called party to send a voice message response to the calling party. The calling party will be notified that a response is coming. The called party creates the response by speaking into the microphone of computer 22. The response is then converted to a digital audio file and sent to node 12 as an attachment to an e-mail. Node 12 then plays the audio file to the calling party.

Another option allows the called party to be connected to the calling party directly through network 18 (i.e., with the called party using Internet telephony or any other known method). This allows the called party to engage in a live two-way conversation with the calling party.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, instead of delivering the voice message using e-mail, in one embodiment the voice message is sent to an Internet Web page that is automatically pushed to the called party if the called party is on-line. The called party can then listen to the message using a standard Internet audio player.

Further, in one embodiment computer 22 does not include the capability of listening to audio files yet the called party can still listen to an audio file of the calling party's voice message. In this embodiment, the called party receives an e-mail message that instructs the called party to call node 12 to receive the voice message. Node 12 then plays the voice message to the called party. Node 12 can then complete the telephone call between the calling party and the called party if the calling party has remained on hold.

As described, the present invention transmits a voice message from a calling party to a called party via e-mail if the called party is on-line. The present invention can then immediately notify the calling party if the message has been retrieved. The present invention can further allow the calling party to talk live to the called party or receive a voice message from the called party.

What is claimed is:

1. A method of providing a voice message to a called party at a computer when a calling party initiates a telephone call, said method comprising:
    (a) determining whether the called party is on-line with respect to a first network;
    (b) receiving the voice message from the calling party;
    (c) converting the voice message to a digital file;
    (d) sending an electronic mail message that includes the digital file to the called party over the first network if the called party is determined to be on-line;
    (e) receiving an indication when the called party has opened the electronic mail message; and
    (f) providing the indication to the calling party,
wherein the indication is provided to the calling party during the telephone call.

2. The method of claim 1, wherein the digital file comprises a digital audio file.

3. The method of claim 1, wherein the digital file comprises a digital text file.

4. The method of claim 1, wherein step (a) comprises the step of sending a Unix finger command to the computer.

5. The method of claim 1, wherein the first network is an Internet.

6. The method of claim 1, wherein the telephone call is initiated over a public switched telephone network to a telephone number associated with the called party.

7. A method of providing a voice message of a calling party to a called party comprising the steps of:
    (a) receiving a telephone call at a network node within a first network, wherein the telephone call is initiated by the calling party to the called party over the first network.
    (b) determining whether the called party is on-line with respect to a second network;
    (c) receiving the voice message from the calling party;
    (d) converting the voice message to a digital file;
    (e) sending an electronic mail message that includes the digital file to the called party if it is determined that the called party is on-line;

(f) receiving an indication when the called party has opened the electronic mail message; and (g) providing the indication to the calling party, wherein the indication is provided to the calling party during the telephone call.

8. The method of claim 7, wherein the called party is at a computer and wherein step (b) comprises the step of sending a Unix finger command to the computer.

9. The method of claim 7, wherein the first network is a public switched telephone network and the second network is an Internet.

10. The method of claim 7, wherein the digital file comprises a digital audio file.

11. The method of claim 7, wherein the digital file comprises a digital text file.

12. A voice message network system comprising:

a network;

a network node coupled to said network; and a computer coupled to said network node;

wherein said network transfers to said network node a telephone call from a calling party to a phone number associated with a called party if the called party does not answer the telephone call; and wherein said network node is programmed to perform the steps of:

(a) determining whether the called party is on-line with respect to said computers, wherein said computer is programmed to send a first electronic mail message to said network node when the called party is on-line;

(b) receiving a voice message from the calling party;

(c) converting the voice message to a digital file; and (d) sending a second electronic mail message that includes the digital file to said computer if it is determined that the called party is on-line.

* * * * *